United States Patent [19]

Korb et al.

[11] Patent Number: 4,526,924
[45] Date of Patent: Jul. 2, 1985

[54] THERMOSETTABLE COMPOSITIONS CONVERTIBLE TO VITREOUS CARBON AND PROCESS FOR PREPARATION THEREOF

[75] Inventors: Louis L. Korb; Phillip A. Waitkus, both of Sheboygan, Wis.

[73] Assignee: Plastics Engineering Company, Sheboygan, Wis.

[21] Appl. No.: 470,978

[22] Filed: Mar. 1, 1983

Related U.S. Application Data

[63] Continuation-in-part of Ser. No. 394,104, Jul. 1, 1982, abandoned, which is a continuation of Ser. No. 280,846, Jul. 6, 1981, abandoned, which is a continuation of Ser. No. 50,535, Jun. 21, 1979, abandoned.

[51] Int. Cl.$^3$ .................... C08L 61/10; C08G 3/04
[52] U.S. Cl. .................... 524/541; 524/496; 524/904; 525/501
[58] Field of Search .......... 525/501; 524/495, 496, 524/904, 541, 594; 264/29.5

[56] References Cited

U.S. PATENT DOCUMENTS

| | | | |
|---|---|---|---|
| 3,109,712 | 11/1963 | Redfern | 264/29.7 |
| 3,410,718 | 11/1968 | Smith | 524/44 |
| 3,723,368 | 3/1973 | Brown et al. | 524/34 |
| 3,969,124 | 7/1976 | Stewart | 524/496 |

FOREIGN PATENT DOCUMENTS

1098029  1/1968  United Kingdom .

521294  9/1976  U.S.S.R. ................ 524/496

Primary Examiner—Theodore E. Pertilla
Attorney, Agent, or Firm—Walter J. Monacelli

[57] ABSTRACT

The compositions disclosed herein are suitable for thermosetting and conversion to vitreous carbon. They comprise intimate uniform mixtures of powder or otherwise blendable form of 20-80% by weight of a solid phenolic-aldehyde Novolak resin and of 20-80% by weight of a solid phenolic-aldehyde resol resin, the percentages being based on the combined weight of the Novolak and resol resins, and the aldehyde in said Novolak resin comprising at least 50 molar percent, preferably substantially 100 percent, furfuraldehyde, together with a carbonaceous filler, preferably graphite, in a proportion as high as 76% by weight based on the total composition. Generally the graphite may comprise 30-70%, advantageously 35-65% and preferably 40-60% of the molding composition. The vitreous carbon produced from these compositions have improved properties in electrical properties and in the capability of being suitably molded and carburized into large thin plates which are much more stress-free than otherwise produced. The composition may also contain 0-12 parts, preferably 0.12-8 parts hexamethylenetetramine per 100 parts of Novolak resin. The intimate mixture of these resins is advantageously made by blending resin components having a particle size of less than 40 mesh, preferably less than 100 mesh.

23 Claims, No Drawings

THERMOSETTABLE COMPOSITIONS CONVERTIBLE TO VITREOUS CARBON AND PROCESS FOR PREPARATION THEREOF

This application is a continuation-in-part application of copending application Ser. No. 394,104 filed July 1, 1982, now abandoned, which is a continuation of application Ser. No. 280,846 filed July 6, 1981, now abandoned, which in turn is a continuation of application Ser. No. 50,535 filed June 21, 1979, now abandoned.

BACKGROUND OF THE INVENTION

1. Field of the Invention

This invention relates to new compositions comprising a mixture of a Novolak resin and a "resol" resin. More specifically, it relates to such mixtures in intimate, uniformly blended form which are capable, upon heating, or thermosetting and eventually, under appropriate carburizing conditions, of forming vitreous carbon.

2. State of the Prior Art

Vitreous carbon, as normally prepared, is at least 99.9% pure, having an ash content of 200 PPM or less. Thus, with its low permeability, negligible porosity and low specific surface, vitreous carbon is very inert. Its resistance to hydrochloride, hydrofluoric, nitric, sulfuric and chromic acids and to mixtures of nitric acid with oxidizing agents is much better than with non-vitreous carbons. The rate of attack on vitreous carbon by molten zinc, lead, tin, phosphorus, silver, arsenic, etc. is very low.

The extreme inertness, impermeability and non-porosity qualifies vitreous carbon as an important and useful material of construction for use in a number of applications and in various industries. For research and development work this material has been used in fabricating beakers, basins, boats, reaction, tubes, etc. and for extensive use in the processing of semiconductors, fluoride laser materials, zone refining of metals, zone refining of chemicals, biomedical applications, fuel cell electrodes, etc.

However, industrial applications of vitreous carbon have been made only in recent years. Since vitreous carbon is not wet by a wide range of metals including zinc, silver, copper, tin, lead, aluminum, gold, platinum and others, it has found application in the processing of some of these metals and their alloys, for example, in the dehydrogenation of molten aluminum with chlorine gas. Dip pipes of this material for corrosive liquids have also been successfully used.

The growth of industrial applications for this material has been restricted in large measure by the inability to produce large and properly cured small moldings or extrusions in the required shapes and by use of conventional molds or dies at conventional rates and reasonable cost. There has been difficulty in making large thin plates suitable for use in fuel cells.

In the parent application, Ser. No. 394,104, the Patent and Trademark Office has relied on the following references: British Pat. No. 1,098,029 (1968); Redfern U.S. Pat. No. 3,109,712; Brown et al U.S. Pat. No. 3,723,368; and Smith U.S. Pat. No. 3,410,718. However, none of these references show the superiority of a phenol-furfuraldehyde Novolak in admixture with a phenol-formaldehyde resol for the preparation of vitreous carbon, particularly when there is a filler such as graphite in the mixture which makes it more urgent that the resin mixture has superior flow properties so as to avoid the strains and stresses that otherwise occur in the molded and vitreous carbon products. As pointed out hereinafter, the plasticity and flow properties contributed by the phenol-furfuraldehyde Novolak-phenol-aldehyde resol combination, particularly with a substantial amount of graphite filler, is not attainable by a phenol-formaldehyde Novolak combination with a phenol-aldehyde resol.

SUMMARY OF THE INVENTION

In accordance with the present invention, it has been found that large, thin plates may be formed by starting with an initial composition of 20-80 percent by weight of a solid phenolic-aldehyde Novolak resin and 20-80 percent by weight of a solid phenolic-aldehyde resol resin, the percentages being based on the combined weight of the two resins, and the aldehyde in said Novolak resin comprising at least 50 molar percent, preferably substantially 100 percent furfuraldehyde, together with a finely divided carbonaceous filter, preferably graphite, in a proportion as high as 76 percent by weight based on the total composition. Generally, the graphite may comprise 30-70 percent, advantageously 35-65 percent and preferably 40-60 percent of the molding composition. Although the two resins may be cured together with no added curing agent, it is very often advantageous to have a small amount of a curing agent such as hexamethylenetetramine (hexa) present. Thus the composition may contain 0-12 parts, preferably 0.12-8 parts of hexa per 100 parts of Novolak resin. Another important factor is that the solid resins have an initial fine particle size to permit intimate and uniform mixture or blending of the two resins. The particle size is advantageously less than 40 mesh, preferably no greater than 100 mesh and most preferably no greater than 32 microns in size. (Mesh sizes are measured on U.S. Standard sieves and screen analyses are performed according to ASTM Method D1921-63.)

A "resol" resin is the resinous reaction product of a phenol and an aldehyde which has been condensed (reacted) only to a stage where it still melts when heated and is still soluble in acetone, and the resin still has sufficient residual reactivity that it may be cured by heat without the addition of a curing agent to an insoluble and infusible condition. A resol resin is also known as an "A" stage phenolic resin, or also as a "single stage" resin, because it is curable without the addition of any crosslinking agent. Upon progressing from the "resol" or "A stage" resin by heating, an intermediate stage is reached before the final insoluble, infusible cured condition is reached. This intermediate stage, or "B stage" resin is termed a "resitol".

A "resitol" is a resin of the same type as the "resol" except that the aldehyde-phenolic condensation has been carried out to the stage where it has become infusible but upon heating, will decidedly soften, but not melt. The "resitol" swells in acetone but is insoluble in it. When heated, a resitol distorts substantially and when a formed or shaped resitol piece is ejected from a mold, the lack of dimensional stability makes the product practically useless.

The "resol" and "resitol" resins are prepared by using the aldehyde in a molar proportion greater than 1-1 with the phenol. Since sufficient aldehyde is already present to give a cure to the insoluble infusible state, there is no need to add a curing agent such as hexa for final curing. However, in preparing the resol resin it may be desirable to add a small amount of hexa to obtain a harder and more easily grindable resol. For example, 0.005 to 0.03 mole, preferably 0.01 mole of hexa per mole of phenol is advantageous for this purpose. In any case the amount of hexa is small enough that the resol retains its properties of fusibility and acetone solubility and is fused only by continued heating. However the amount of hexa used in preparing the resol is not calculated in the amount which may be subsequently added to aid in the curing of the Novolak-resol mixture.

When the resol is difficult to grind it is possible to use larger particles of the resol with finely divided Novolak and to extend the milling or subsequent blending step so that the Novolak is worked into intimate contact with the resol and the resol is comminuted by the milling or blending operation into an intimate blend of the two resins.

The final, or "C stage" of a phenolic resin is characterized by insolubility, lack of swelling in acetone, infusibility and freedom from softening upon heating. A "C stage" phenolic-aldehyde resin is also known as a "resite".

In contrast, a "Novolak" resin is one prepared with a deficiency in aldehyde so that it may not be cured unless a curing agent such as hexa is added. Therefore, a "Novolak" resin may be defined as the resinous reaction product of a phenol and an aldehyde that, for all practical purposes, does not harden or convert to an insoluble, infusible condition upon heating but remains soluble and fusible. (See "The Chemistry of Synthetic Resins" by Carleton Ellis, Vol. 1, page 315, Reinhold Publishing Co., N.Y., N.Y. 1935.)

In curing a Novolak resin, a substantial amount of a curing agent is used such as hexa to overcome the deficiency of aldehyde-bridging groups. This added curing agent may be an aldehyde such as formaldehyde or an alkylene-providing compound, such as hexamethylenetetramine, which provides methylene groups for curing. However when a substantial amount of such a curing agent is used in preparing a cured Novolak resin for ultimate vitreous carbon formation, there is generally sufficient by-product gas formed or retained so that in the later stages of the resin processing, molded-in stresses may be formed. In any case, the products do not have the properties desired.

By the composition and process of this invention it has been found possible to prepare resins for ultimate formation of vitreous carbon of very good properties by virtue of the fact that at least most or substantially all of the final bridging between phenolic groups is effected through methylol groups present in the resol resin. Thus the necessity for adding a curing agent to provide bridging groups for the Novolak molecules is eliminated or reduced. In any case, the amount of curing agent required to produce the desired curing is reduced substantially to the extent that the problem of stresses and strains and accompanying weaknesses in the vitreous carbon have been avoided or reduced to a tolerable amount. Thus the carbonizable phenolic resins produced from the composition of this invention is the coreaction product of a Novolak resin and a resol resin.

For most purposes for which the vitreous carbons of this invention are to be applied, those prepared from phenol-furfuraldehyde Novolaks are preferred. It is believed that the Novolak resin has a plasticizing effect on the resol resin, thereby allowing the viscous mass to flow more uniformly and readily at lower pressure to completely fill the mold before a high degree of gelation and crosslinking occurs. This contrasts with the initially faster curing rates of the single stage resins (resols) which create large initial portions of gelled or crosslinked polymer molecules, thereby also forming local strained areas in the molded part. This plasticizing effect is believed to allow the production of molded shapes and forms which are substantially free of molded-in stress. This allows the formed product to be ejected from a hot mold without distortion or deformation. Moreover, when the molded product is carburized to vitreous carbon, this strain-free condition carries over into the final product.

The results obtained by molding the compositions of this invention also contrast with the results obtained in molding a mixture of Novolak and hexa. To provide a cure in a reasonable time schedule, it is generally necessary to use between eight and twenty or more parts of hexa per one hundred parts of Novolak. This amount of hexa tends to soften and plasticize the curing and cured resin. This, together with the by-product nitrogenous gases introduce molded-in stresses and strains in the formed product which cause distortions in the product after ejection from the mold or when subjected to carbonization temperatures.

The reduction in strains in products molded and carbonized from the compositions of this invention can be demonstrated by transmitted polarized light through products molded with unfilled, clear specimens as described more fully hereinafter.

Novolak and resol resins may be prepared by the condensation of a large variety of phenols and aldehydes as described in the above-mentioned "The Chemistry of Synthetic Resins". The author describes numerous phenolic-aldehyde resins in Chapters 13-18, modified phenol-aldehyde resins in Chapter 19, and modified phenol-formaldehyde resins in Chapter 20.

Typical examples of the phenols which may be used are: phenol itself and its various homologs such as meta-cresol; the various xylenols, hydroquinone; pyrogallol; resorcinol; the halogenated derivatives of phenol which leave two or more positions available for condensation with the aldehyde, such as p-chlorophenol, p-bromophenol, p-fluorophenol, etc.; the various naphthols, the various hydroxy-benzoic acid esters; p,p'-dihydroxydiphenylmethane; p,p'-dihydroxydiphenyl-2,2'-diphenylpropane, etc. Ortho- and para-cresol may also be used when mixed with another phenol, such as meta-phenol, which has three available reactive positions such as ortho and para to permit crosslinking. For economic and availability reasons, phenol itself is preferred.

Similarly, a wide variety of aldehydes may be used in preparing the resol resins. Typical examples are formaldehyde, paraformaldehyde, acetaldehyde, butyraldehyde, glyoxal, acrolein, benzaldehyde, terephthaldehyde, etc. Again, for reasons of cost and availability and for ease in processing, formaldehyde is preferred. The term "aldehyde" is intended to include not only aldehydes per se, that is, compounds containing the —CHO group, but also compounds which, under reaction conditions, can engender an aldehyde or provide the same type of alkylene group for bridging as provided by the aldehyde. For example, hexamethylenetetramine provides methylene bridging groups and acetylene, under appropriate conditions with phenol, produces resins similar to those produced from phenol and acetaldehyde. When less than 100% furfuraldehyde is used to make the Novolak, the other aldehyde used may be selected from those listed above for the resol resins.

The appropriate molar ratio of aldehyde to phenol for preparing the Novolak and for preparing the resol respectively depends upon the nature of the aldehyde and the nature of the phenol and the conditions under which they are reacted. A generalization can be made, however, when the phenolic compound is phenol per se and the aldehyde is formaldehyde or furfuraldehyde. For example, phenol-formaldehyde Novolaks are usually prepared using aqueous formaldehyde under acidic conditions due to the formic acids present in the formaldehyde solution or by the addition of acids and/or salts to establish acid conditions. Under these conditions, a formaldehyde-phenol molar ratio of 0.55/1 to 0.95/1, preferably 0.7–0.88/1, in the original reaction mixture, together with a pH of 0.8 to 5.5, will produce a Novolak resin, that is a resin which, when isolated and heated, will not cure. The formaldehyde may be added all at once or in two or more stages.

When furfuraldehyde (furfural) is used as the condensing aldehyde the proportion is advantageously in the range of about 0.6–0.9, preferably about 0.70–0.75 mole per mole of phenol. Here again the furfural may be added all at once or in two or more stages.

However, if acrolein is used as the aldehyde, gelation and crosslinking can occur when 0.5 mole of acrolein is used per mole of phenol. This is because the vinyl group in the acrolein also reacts to cause crosslinking. Moreover, larger amounts of formaldehyde than indicated above can be used when mixtures of ortho- and meta-cresol or ortho- and para-cresol are used.

The primary requirement is that the Novolak conforms to the accepted definition of a Novolak, namely that the phenolic-aldehyde resin will not cure merely upon heating and therefore for all practical purposes, is not heat-convertible to an insoluble, infusible product.

A further requirement of the Novolak is that it must be capable of conversion to an insoluble, infusible product by heat reaction with added amounts of an aldehyde, such as formaldehyde or an aldehyde reactive type of compound such as hexa. (See Ellis as cited above, p. 327.) Thus the Novolak may be tested by the addition of 10% by weight of hexa and heated. A true Novolak will be cured to an insoluble, infusible resin. If the material is not so cured upon testing, an additional amount of hexa may be added and the test repeated. If still no cure, the material is definitely not a Novolak. For use in the practice of this invention, the Novolak must meet this curing test to insure that it will be capable of curing with the resol to an insoluble, infusible state.

Thus in the practice of this invention part or all of the crosslinking bridges of the Novolak are formed by the resol. Some hexamethylenetetramine may be used to supplement the crosslinking bridges formed by the resol. Advantageously a small amount of hexa is used to assist in a faster cure. However the amount of hexa may be an amount that will produce the desired effect but still be low enough to avoid the disadvantages described above. As indicated above, this amount is 0 to 12 parts, preferably 0.12 to 8 parts by weight per hundred parts of the weight of Novolak resin.

Resols are prepared from phenols and aldehydes over a wide molar ratio of reagents depending on the particular phenol and particular aldehyde. In this case also, a generalization can be made when the phenolic compound is phenol and the aldehyde is formaldehyde. Phenol-formaldehyde resols are usually prepared under alkaline or basic conditions, or in the presence of metal salts such as zinc acetate, to give resinous condensation products having a number of unreacted methylol groups as well as methylene bridges, both derived from the aldehyde. The ratio of formaldehyde to phenol varies for resols, preferably from a ratio of 1.05/1 to 1.5/1. In some formulations some of the bridging groups may be supplied by hexa.

The available methylol groups are the active functional groups that allow the Stage A resol to progress to the Stage B resitol and then to the Stage C resite. Thus it is a primary requirement that the resols used in the practice of this invention conform to the standard definition of resol, namely that heat alone will effect the progress of the resol to the resitol and then to the resite.

These available methylol groups in the resol are likewise the active functional groups which coreact with the Novolak to effect bridging and thereby produce the thermoset resin used in subsequent carbonization to produce vitreous carbon.

When furfural is used as the aldehyde in the reaction with the phenol to produce either the Novolak or the resol, an alkaline catalyst is preferred to obtain a controlled condensation. An acid catalyst is avoided since the acid is likely to initiate additional polymerization through the ethylenic unsaturation in the furan ring, which has a cyclic diene-ether structure.

In contrast, when producing a Novolak with furfural under alkaline conditions, such as with sodium carbonate, a furfural-to-phenol molar ratio of 0.60/1 to 0.90/1, preferably 0.70 to 0.75, produces a Novalak which upon normal heating will not cure but will do so upon the addition of formaldehyde or hexa. However if an acid is present during the initial condensation or is added thereafter the resin can undergo additional reaction which may be misinterpreted and the resin considered to be resol in character. For example, if a furfural Novalak is treated with a strong acid, a vinyl type addition reaction will be promoted and the resultant additional polymerization will effect bridging between polymer molecules.

As discussed above, the methylol groups in the resol resin react with aromatic rings in the Novolak resin to form bridging or crosslinking and since it is desirable for uniform coreaction between the Novolak and the resol, it has been found that very intimate and uniform distribution of one resin in the other is conducive to improved strength and avoidance of stresses in the moled and carburized products. Therefore, in order to have intimate and uniform blending of the two resins, it is important that they are of a small particle size that forms such intimate mixture. It has been found advantageous, therefore, that the resins should be of a particle size no larger than 40 mesh, preferably no larger than 100 mesh, or on the basis of micron size, the particles advantageously are no larger than 50 or 60 microns and obviously even smaller particles are desirable, for example 5–32 microns or even down to 0.01 micron.

These fine particle sizes permit homogeneity in the resultant mixtures and aid in the uniform and more complete interaction that produces greater strength, freedom from stress, and other desirable properties in the ultimate products.

Uniform dispersion or blends of the two resins may be prepared by a variety of techniques. A partical method is to grind the resins to about 60 mesh size or smaller and then pass the mixture of the powdered resins through a single to two-worm extruder. This method requires close control of the barrel and nozzle temperature of the extruder as well as of the residence time in the extruder to avoid premature gelation which is detrimental since this causes deformation in a molded piece on cooling and causes stresses in the carbonized product. This close control is also necessary if the resin mixture is processed further in a Banbury or on heated rolls.

Another method comprises pregrinding the Novolak and the resol to less than 40 mesh, preferably to less than 100 mesh, followed by blending together with the various appropriate additives, if such are to be used, such as hexa, furfural, graphite, mold lubrican, etc. The resultant blend is then fine ground by air-milling or impace grinding to form a homogeneous blend. This homoegeneous material is further compounded and densified by any of the standard procedures used in processing phenolic resins, such as in a banbury extruder and particularly on a two-roll heated mill. Typical processing conditions on the mill are in the range of 210°–245° F. on the front end, 75°–110° F. on the back roll and processing time of 1–5 minutes, depending on the flow properties in the densified product.

The densified material is processed for molding by grinding in a unit grinder to specific particle sizes, usually determined experimentally for the particular shape to be molded. A typical distribution range (determined after 15 minutes on a Ro-Tap unit) is:

|   |   | Percent |
|---|---|---|
| On | 10 mesh | 25–35 |
|  | 20 mesh | 30–27 |
|  | 40 mesh | 10–18 |
|  | 60 mesh | 2–10 |
|  | 100 mesh | 2–10 |
|  | 140 mesh | 2–2 |
| Through | 140 mesh | 5–75 |

For reasons of efficiency, the fine grinding of the resins to low micron dimensions is preferred to achieve a uniform blend.

For general commercial application, the method of processing on heated rolls may be preferred for blending the resol and the Novolak together or with additives.

As used herein, the expression "densify" is intended to mean the step of intimately mixing or blending particles of two or more types by rolling, milling, extruding, etc.

The thermoset resins produced from the compositions of this invention are suitable for molding and carburization to prepare filled vitreous carbon products adapted to various industrial applications. The cured resite resins of this invention are adaptable for use as electrodes in electrochemical system, such as in chlorine cells, in molten aluminum systems, in electroplating systems, in direct electrical generating systems using strong electrolytic acids such as sulfuric and phosphoric acids together with methane and air, hydrogen and oxygen or chlorine, etc.; as fuels; as Barnes capture devices or control rods in nuclear reactors; in aerospace systems; as supports or walls in catalytic systems; as large metallurgical crucibles; diffusion sheets or plates in diffusion devices; as large zone refining units, etc.

The production of formed shapes from the Novolak-resol compositions of this invention is achieved by well known techniques, such as by compression, injection, transfer and impulse molding. In each case the resin mixture is introduced into a hot mold under pressure at least sufficient to force the mixture to fill all parts of the mold, and the resin mixture is cured to an insoluble, infusible state.

The temperature used will vary over a wide range depending on the composition of the Novolak, the composition of the resol, the presence or absence of hexa, the presence or absence of added furfural as either an external cross-linking agent or a reactive plasticizer, the amount and type of carbonaceous fillers and other non-gassing fillers, etc. However, most of these compositions can be molded in the range of 100° to 166° C. (212° to 330° F.) but in some cases temperatures as high as 180° C. (356° F.) may be used. The preferred range is 149°–166° C. (300°–330° F.).

The same factors recited above as affecting the molding temperatures used, as well as the temperature itself, in many cases also affect the choice of pressure used in molding to a shaped form. For example, a higher molding pressure is required for a blend of a phenol-formaldehyde Novolak (PFN) and a phenol-formaldehyde resol (PFR) than the corresponding blend containing a phenolfurfural Novolak (PFUN). Similarly, a higher pressure is required to mold a blend containing 60% graphite filler than for one containing 40% or 20% or 0% graphite. Thus, a PFUN-PFR blend containing 60% graphite may require 6–8 tons per square inch compared to 1–2 tons per square inch for a corresponding blend containing no graphite, and 500–1000 psi for the corresponding composition containing 1–5% of furfural as a reactive carbonizable plasticizer.

Moreover, the shape of the molded part will also influence the selection of a suitable molding pressure which may require one pressure for compression molding and a higher pressure for transfer molding, and a still higher pressure for injection molding which can be 20 tons per square inch for injection in contrast to 10 tons per square inch for transfer and 5 tons per square inch for compression molding. The general range of pressures lies between 0.5 to 25 tons per square inch, and the preferred ranges are 2–20 tons per square inch and 1–5 tons per square inch for compression molding.

Extractability tests on the molded products of this invention show that there is less than 2 percent and generally less than one percent of material extracted by acetone based on the resin content of the product provided there is no non-reactive additive present, such as a plasticizer. In fact, in most cases the molded product has very little extractible material even when strong solvents, such as dimethylformamide, are used. The extractability tests are performed according to ASTM Procedure D494-46.

The weight ratio of the respective Novolak and resol resins, as well as the presence or absence of various additives or modifiers, such as external curing agents, e.g., hexa, reactive plasticizers, such as furfural, processing aids, such as molding plasticizers, e.g. zinc stearate or stearyl alcohol, and various type of fillers, such as graphite, etc., will depend on the application for which the vitreous carbon is to be utilized. As discussed herein, the applications for the products of this invention are extremely diversified, including chemically resistant piping and equipment, and walls and electrodes for fuel cells, etc.

In these compositions, the PFUN:PFR ratio can be from 80:20 to 20:80. Hexa may advantageously be added in a proportion of zero up to 12 parts by weight, preferably 0.12 to 8 parts by weight of hexa per 100 parts weight of PFUN. Also 0–5 parts by weight of furfural per 100 parts by weight of PFUN plus PFR may be added.

Mold lubricants may be incorporated in the resin blends. Suitable lubricants include fatty acids of 14–22 carbon atoms, their esters of alcohols containing 1–22 carbon atoms and their metal salts, such as Ca, Zn and Mg salts. Typical of these which may be used are oleic acid, stearic acid, montan wax, stearyl stearate, glyceryl mono-oleate, glyceryl monostearate, the commercial wax sold under the brand name "Acrawax", zinc, calcium and magnesium stearates, etc. For biomedical applications the lubricants should be free of metals and metallic compounds. The lubricants may be used in proportions of 0.05–3 percent by weight based on total resin composition.

A very useful class of fillers comprises carbonaceous fillers, for which vitreous carbon itself exhibits high adhesion. Such materials include pyrolytic graphite; the normal graphites such as that formed of flat, parallel lamellae of carbon held together by van de Waal's forces (distance approximately 3.35° A); carbonized celluloses; etc. For economic reasons, the regular graphites generally find greater use in vitreous carbon than the other fillers.

In general, with regular graphite as a reference, the proportion of such fillers in ready-to-use molding powders of this invention may be as little as 5% to produce a noticeable effect but is advantageously between 35 and 65%, preferably about 40–60% by weight of the molding composition. By adjusting the amount of Novolak in the mixture together with the use of hexa, lubricants, furfural, etc., the proportions of graphite may be adjusted to 30 to 70% of the molding composition. Moreover the compatibility of the graphite may be improved by the use of finer grades of graphite as compared to more coarse grades. In some cases it is desirable to use a combination of varying fineness or coarseness in the graphite. Similar considerations apply to the other carbonaceous fillers.

The amount of carbonaceous filler can also be expressed as parts per 100 parts of the combined weight of Novolak and resol resins. Thus the moldable compositions of this invention comprise a heat curable, pressure moldable blend of 80–20 parts by weight of a phenolic-aldehyde Novolak and 20–80 parts by weight of a phenolic-aldehyde resol, with the combined weight of Novolak and resol totaling 100 parts by weight, plus 0–230, preferably 0–150 parts by weight of a carbonaceous filler, 0–5 parts by weight of furfuraldehyde, 0–12 parts by weight, preferably 0.15–8 parts by weight of hexa, and 0–3 parts by weight of mold lubricant, with the proportion of each of the additives being based on 100 parts by weight of the combined Novolak and resol. With extreme dispersion methods, such as ball-milling carefully to extremely fine particle size, the amount of graphite may exceed somewhat the amount defined above.

A typical "high" graphite composition may be comprised as follows: 60% graphite, 22.1% phenol-formaldehyde resol, 13.0% phenol-furfural Novolak, 1.48% hexa, 0.6% stearyl stearate, 1.25% zinc stearate and 1.25% furfural. Another typical composition may comprise: 40% graphite, 35.75% phenol-formaldehyde resol, 20.17 phenol-furfural Novolak, 0.1% stearyl stearate, 1% zinc stearate and 0.6% furfural. The percentages are percent by weight based on the total composition.

Another typical "high" graphite composition containing 49.9 percent by weight of graphite, 29.2% PFR, 16.6% PFUN, 1.9% hexa, 0.4% stearyl stearate, 1.0% zinc stearate and 1.0 furfural, after being transfer molded as described herein, is ground as tested for acetone soluble content. An average of these tests shows 0.48% soluble material which analyzes to show a mixture of stearate plasticizer and unreacted furfural.

In special applications, finely dispersed pyrolytic graphite may be preferred as a filler over normal graphite because of its anistropic properties which appear to reinforce the vitreous carbon with its unique thermal and mechanical properties. Pyrolytic graphite is pure crystalline graphite deposited from carbon-bearing vapor at temperatures in excess of 2000° C. (See "Ablative Plastics", G. F. D'Alelio and John A. Parker, Marcel Depper, Inc., N.Y., N.Y. 1971, pp. 119–120). This material is metallic in appearance, impervious to gases and contains no binders such as are found in the regular commercial graphite used as electrodes. X-ray diffraction patterns of pyrolytic graphite show significant deviations from those of normal graphite as evidenced by an unusually high degree of peripheral orientation. The crystals have their basal planes aligned parallel to the surface of deposition. This orientation is a function of deposition temperature and density and is responsible for the marked anistropic properties of pyrolytic graphite. When pyrolytic graphite is used as filler in the compositions of this invention it appears that vitreous carbon has increased regions of graphite (or diamond) crystallinity which are dispersed among the small stacks of graphite-like layers. The reason for this is not clear but it is probably due to a nucleating effect. To some measure this allows some variability in the ratio of the small stacks of graphite-like layers interpersed with regions of graphite crystallinity.

The co-reactive blends of this invention are converted to vitreous carbon by the intermediate steps of molding and curing the shaped form. Adequate cure and therefore curing temperature and time, are of paramount importance since undercured articles usually crack during the carbonization process. The extent of cure may be checked by determining the amount of acetone extractable material. Satisfactory products are obtained when the acetone extractable value is no greater than 2 percent, preferably less than 1 percent, as determined by ASTM Method D494-46 based on the weight of resin content.

Many methods of molding may be used. As previously indicated, the formed precursor part may be compression, transfer, extrusion or injection molded. High production volumes are readily obtained with the blends of this invention by transfer and injection molding in a multicavity mold. In some cases, shaped precursor parts can be machined from other molded or extruded shapes.

In a typical operation the ground molding composition is first preformed to eliminate trapped air and is electrically preheated to 230° F. (110° C.). This preform is then molded in a preform press using a 5.5" diameter ram operated at 500 psi line pressure. The parts may be cured at 300° F. (149° C.) for 4–5 minutes with a cavity pressure of approximately 2000 psi. Obviously various other techniques may be used.

The precursor shaped article is converted to a shaped vitreous carbon article by closely controlled thermal degradation of the article in an inert atmosphere in a furnace until the maximum heat-treating temperature is reached. Then the vitreous carbon article is cooled in the closed furnace and in the inert atmosphere. Usually large numbers of precursor moldings are treated in a single heating operation while retained in open graphite containers in the furnace.

In most cases the optimum firing cycle of time versus temperature is determined experimentally for each different shape since the geometry, particularly the wall thicknesses, of the molded part has a direct bearing on the rate. Also the time-temperature relationship is dependent on the degradation characteristics of the final cured resin. For example, it is logical and obvious that cured products derived from (1) a PFN-PFR blend; (2) a PFUN-PFR blend; (3) a PFN-PFR blend containing 5% furfural; (4) a PFUN-PFR blend containing 10% hexa; and (5) the admixture of (4) containing an equal amount of graphite would require different temperature-time firing cycles for the same shaped article. The variations in firing cycles will be even greater if the articles have different wall dimensions.

A typical firing cycle generally has a continually increasing temperature and usually has variable rates of increase in different parts of the cycle. During the firing a substantial volume shrinkage of the article occurs, which is usually in the range of 15 to 25% in those moldings which contain no carbonaceous or other filler.

During the firing of such unfilled molded parts, about 30-35% by weight of the part is lost as volatile gas. When carbonaceous fillers are used with the resin mixture, the shrinkage and weight loss is reduced in proportion to the filler content. To flush out the large amount of gas generated during the vitreous carbon formation, a stream of inert purge gas, such as nitrogen, helium or argon is used, or alternatively, a reduced pressure of $10^{-2}$ torr or less may be applied. The outgassing is predominant in certain temperature ranges. For example, from room temperature up to 600°-700° C. the temperature increase is typically at a rate of 1°-5° C. per hour. Above about 700° C., the temperature can be increased much more rapidly, as from 10° to 50° C. per hour. Generally for most parts the temperature above 700° C. is increased at a rate of 10° C. per hour up to 800°-850° C., and thereafter at 20°-50° C. per hour to the maximum temperature which generally need not be above 1800° C. In very special cases where high thermal stability is required in the shaped vitreous carbon product, the heating may be continued up to 2000° C. and in some very special cases up to 3000° C. and held at that temperature for a least 24 hours. Then the temperature is dropped gradually at a rate of 10°-20° C. per hour.

Where desired, the critical temperature regimes can be determined by thermogravimetric (TGA) and differential thermal analysis (DTA). The thermal regimes thus determined are characteristic of the chemistry and thermal history of the molded phenolic resin part.

It has been found that the blends of Novolak and resol resins prepared as described above may be used for preparing molding compositions for purposes other than the production of vitreous compositions and that such molded products have various improved properties by virtue of the stress-free interaction of the Novolak and resol resins. In such cases the proportions of fillers and additives correspond substantially to those reported above for use in the compositions to be converted to vitreous carbon.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

Preparation of Phenol-Formaldehyde Novolak Resin (PFN)

Into a 4 liter resin flask equipped with a mechanical stirrer, reflux condenser and thermometer is placed 2000 gms (21.28 moles) USP phenol; 882 gms (15.28 moles) aqueous formaldehyde (52%); 200 gms water and 12 gms (0.10 mole) phosphoric acid (85%). The pH of the resulting mixture is 1.05. This mixture is then heated to reflux and refluxed a total of 5 hours. The free formaldehyde content of the mixture at this point is found to be 0.84%. At this point the reflux condenser is replaced with a distillation condenser and batch distilled under atmospheric pressure for one hour until the batch temperature reaches 160° C. At this point a mixture of 173 gms (3.0 moles) of 52% aqueous formaldehyde, mixed with 70 gms of water is slowly added to the mixture over a period of 36 minutes. During the addition, the batch temperature drops to 142° C. When all the aqueous formaldehyde has been added, the batch is held at 142°-150° C. for 15 minutes. Then the receiver on the distillation condenser is replaced with a vacuum receiver to allow completion of the batch under vacuum. The resin is then dehydrated to a batch temperature of 165° C. under vacuum of 28 inches of mercury. The vacuum is released and the resin discharged from the vessel to yield 2027 gms of product, which exhibits a gradient bar melting point of 223° F. and a glass transition temperature as measured by differential scanning calorimetry of 70° C. (158° F.). This resin is a non-curing Novolak as shown when tested on a hot plate at 330° F. However, when thoroughly blended with 10 parts per hundred (pph) of hexa, it has a set time of 24-25 sec. when heated at 330° F. (166° C.).

EXAMPLE II

Preparation of Phenol-Furfuraldehyde Novolak Resin (PFUN)

Into a 4 liter resin vessel equipped with a mechanical stirrer, distillation condenser, heating mantel and thermometer is placed 2000 gms (21.28 moles) of USP phenol and 1480 gms (15.25 moles) of furfural. This mixture is heated to 66° C. and 30.0 gms (0.36 mole) sodium carbonate added. The charge is then slowly heated to 121° C., at which temperature the heating mantel is removed. The reaction then becomes exothermic and the temperature continues to rise until boiling begins at 135° C. The distillate is collected in a separating device and the furfural layer is periodically drawn off and returned to the batch during the course of the reaction. Distillation is continued for 3 hours, 40 minutes with the batch temperature maintained between 133° and 139° C. The resin is then discharged from the vessel and allowed to cool to a solid which has a melting point of 89° C. (192° F.), a yield of 3230 gms, a glass transistion temperature of 330° K. (134.6° F.). This is a non-curing Novolak resin, as shown when tested on a hot plate at 330° F., but when thoroughly mixed with 10 pph of hexa, has a set time at 330° F. of 65-69 sec.

EXAMPLE III

Preparation of PFUN with Mold Lubricant Added

The procedure of Example II is repeated except that midway in the distillation 30 gms of glycerylmonooleate is added, thoroughly mixed and the distillation continued. The resin has a melting point of 85.5° C. (186° F.), a glass transition temperature of 327° K. This is also a non-curing Novolak resin and with 10 pph of hexa, has a set time of 67-68 sec.

EXAMPLE IV

Preparation of Phenol-Formaldehyde Resol Resin (PFR)

(a) Into equipment as used in Example I there is placed 1500 gms (15.96 moles) of USP phenol, 1197 gms (20.75 moles) of aqueous formaldehyde (52%), 23 gms (0.16 mole) of hexa, and 7 gms (0.170 mole) of sodium hydroxide (97%). This mixture is warmed to 90° C. and maintained at this temperature for one hour. At the end of this period the reflux condenser is replaced with a vacuum distillation condenser and receiver. The batch is then maintained at a vacuum of 26" of Hg and heat supplied until the batch temperature reaches 90° C. (194° F.). Then the vacuum is adjusted to 28" Hg and distillation continued for one hour. The reaction is then terminated and the product discharged from the vessel. The amount of distillate water collected is 940 gms. The product weighs 1855 gms and has a gradient bar melting point of 79.5° C. (175° F.), a glass transition temperature as measured by differential scanning calorimetry of 321° K. (118.4° F.) and a hot plate set time of 17-18 seconds at 330° F. (165.5° C.).

(b) The above procedure is repeated using 1252.7 gms (21.71 moles) of aqueous formaldehyde but omitting the hexa, and the distillation is continued until about 980 gms of distillate water is collected. The $CH_2O$/phenol ratio of the resol is 1.36/1. However the product is softer than that obtained in the above procedure (a) so the product is placed in a pan and heated in an oven at 60° C. (140° F.) until a specimen indicates that the melting point is about 175° F. (79.5° C.) and is similarly grindable as the resol produced in (a).

(c) The procedure of Example IV(a) is repeated except that 1058 gms (18.34 moles) of the aqueous formaldehyde solution is used. The product is a grindable resol.

(d) The procedure of Example IV(a) is repeated using 1335 gms (23.15 moles) instead of the 1197 gms of the aqueous formaldehyde. The product is a grindable resol.

EXAMPLE V

Densifying and Molding of Mixtures of Phenol-Formaldehyde Novolak (PFN) and Phenol-Formaldehyde Resol (PFR)

The Novolak resin of Example I and the resol resin of Example IV(a) are ground separately in a laboratory Wiley mill and passed through a 0.05 inch screen. A blend is made on a small ribbon blender using 600 gms of PFN and 1400 gms of PFR. This blended mixture is next fine ground through an impact grinder to yield an intimate mixture having a maximum particle diameter of approximately 10 microns. This mixture is compounded on a differential 2-roll heated mill. The front roll of this mill is maintained at 220°-230° F. (104°-110° C.) and the back roll at 80°-100° F. (26.7°-37.8° C.). The milling is continued for 1.5 minutes after sheet formation, and then the sheet is removed, cooled and ground. The particle size distribution of this material suitable for molding is:

| Mesh Size | % |
|---|---|
| On 10 | 28-34 |
| " 20 | 32-36 |
| " 40 | 12-16 |
| " 60 | 5-9 |
| " 100 | 4-8 |
| " 140 | 1-3 |
| through 140 | 4-5 |

The molding flow properties of this product is measured in a C. W. Brabender Torque Rheometer equipped with a one-half size mixing bowl equipped with roller blades. The instrument is operated at 125° C. with 60 RPM with a connector setting of 1.5, a sensitivity of 45 (X5) with no suppression of torque. This test gives a minimum torque reading after melting of 1700-1800 meter-grams and a charge-to-setting time of 80 sec. This material is also moldable in a standard multicavity transfer mold using 600 psi of line pressure on the transfer ram. The parts so molded are clear and amber in color.

EXAMPLE VI

Demonstration of PFUN-PFR Blends with Wide Range of Graphite and Other Additives Large batches of the PFUN resin of Example II and the PFR resin of Example IV(c) are prepared so that identical resins may be used in a large number of comparative mixtures. Four mixtures of varying ratios of resins with varying amounts of hexa, graphite and additives are prepared. The amounts of hexa, graphite, zinc stearate, stearyl stearate and furfural are shown in the table below. The resins are ground and passed through a 0.05" screen, blended with graphite and the respective additives, and compounded on a 2-roll differential mill with the front roll maintained at 200° F. (93° C.) and the back roll at 300° F. (149° C.). The milling is continued for 15 seconds after complete melting of the resin. The resulting sheets are cooled, ground as in the preceding examples to a particle size of 6-80 mesh as measured on U.S. Standard sieves. This is molded according to the transfer molding techniques of the earlier examples into plates 22.5 inches×27.5 inches×0.045 inch thickness using compression molding techniques with 868 grams of 2" preforms weighing 62 grams each, on a large 600 ton compression press. The cavity pressure in this molding is 1500 psi and the plates molded at 300° F. (149° C.) for 3-4 minutes. These plates are successfully converted to vitreous carbon of excellent properties by the method described by Thornbury and Morgan (Soc. Plast. Eng. Pactec. 1975, Sept. 16-18, 1975, p. 47). These are placed in an open graphite container in a furnace having nitrogen atmosphere. The temperature in the furnace is raised gradually at a rate of about 2°-3° C. per hour to a temperature of 700° C., at which point the temperature increase rate is adjusted to about 10° C. per hour up to 800°-850° C. and thereafter at a rate of about 30° C. per hour to the maximum temperature of 1800° C., which temperature is maintained for about 25 hours. Then while the nitrogen atmosphere is maintained in the closed furnace, the temperature is decreased gradually at a rate of about 10°-20° C. per hour to room temperature.

| Run No. | 1 | 2 | 3 | 4 |
|---|---|---|---|---|
| Graphite/resin (Wt. ratio) | 50/50 | 40/60 | 50/50 | 60/40 |
| PFUN/PFR (Wt. Ratio) | 50/50 | 40/60 | 30/70 | 40/60 |
| PFR-Ratio of Form./Phenol | 1.15 | 1.15 | 1.15 | 1.15 |
| PFUN (Gms) | 1180 | 1146 | 801 | 764 |
| PFR (Gms) | 1180 | 1719 | 1604 | 1146 |
| Hexa (Gms) | 138.8 | 134.8 | 94.3 | 98.9 |
| Graphite (Gms) | 2498 | 2000 | 1498 | 3000 |
| Zn Stearate (Gms) | 43.83 | 53.20 | 44.66 | 8.87 |
| Furfural (Gms) | 50 | 50 | 50 | 50 |
| Brabender (Duration of Mix) | 300 | 305 | 257 | 237 |
| Flex. Strength, psi | 8640 | 9344 | 8384 | 9792 |
| Tens. Stength, psi | 5867 | 6293 | 6080 | 5547 |
| Flex. Mod. × 10⁶, psi | 1.07 | 0.842 | 1.08 | 1.36 |
| Spec. Grav. of molding | 1.578 | 1.48 | 1.579 | 1.685 |
| On Carbonization: | | | | |
| Wt. Loss (%) | 15.56 | 19.43 | 16.47 | 11.54 |
| Shrinkage in Length (%) | 6.96 | 8.15 | 6.84 | 4.59 |

EXAMPLE VII

The procedure of Example VI is repeated five times using the PFUN resin prepared in the master batch of that example and also using PFR prepared in another master batch according to Example IV(a). The respective amounts of materials and the results are shown in the following Table:

| Run No. | 5 | 6 | 7 | 8 | 9 |
|---|---|---|---|---|---|
| Graphite/Resin (wt. Ratio) | 40/60 | 40/60 | 60/40 | 60/40 | 50/50 |
| PFUN/PFR (Wt. Ratio) | 50/50 | 30/70 | 30/70 | 50/50 | 40/60 |
| PFR (Ratio of Form/Phenol | 1.30 | 1.30 | 1.30 | 1.30 | 1.30 |
| PFUN (Gms.) | 1417 | 962 | 641 | 944 | 955 |
| PFR (Gms) | 1417 | 1925 | 1283 | 944 | 1433 |
| Hexa (Gms) | 166 | 113 | 75.4 | 111 | 112.3 |
| Graphite (Gms) | 2000 | 2000 | 3000 | 3000 | 250 |
| Zn Stearate (Gms) | 52.63 | 53.61 | 8.93 | 8.77 | 44.34 |
| Stearyl Stearate (Gms) | 94.74 | 96.50 | 64.32 | 63.11 | 79.83 |
| Furfural (Gms) | 50 | 50 | 50 | 50 | 50 |
| Brabender (Dur. of Mix) | 345 | 305 | 182 | 230 | 263 |
| Flex. Strength, psi | 7936 | 8320 | 9216 | 7872 | 8072 |
| Tens. Strength psi | 6293 | 5813 | 4747 | 5333 | 506 |
| Flex. Mod. × 10⁶, psi | 0.826 | 0.866 | 1.28 | 1.31 | 1.05 |
| Sp. Grav. of Molding | 1.482 | 1.487 | 1.678 | 1.678 | 1.576 |

Firing by the method described in Example VI gives vitreous carbon of excellent properties with the following weight loss and shrinkage values:

| | | | | | |
|---|---|---|---|---|---|
| Wt. Loss (%) | 20.14 | 18.59 | 11.17 | 11.17 | 15.73 |
| Shrinkage in length (%) | 8.5 | 8.15 | 3.76 | 4.0 | 6.13 |

EXAMPLE VIII

The procedure of Example VI is repeated four times using portions of the same master batch of PFUN and using PFR from a master batch prepared according to the procedure of Example IV(d). The respective amounts of materials and the results are shown in the following Table:

| Run No. | 10 | 11 | 12 | 13 |
|---|---|---|---|---|
| Graphite/Resin (Wt. ratio) | 50/50 | 40/60 | 50/50 | 60/40 |
| PFUN/PFR (Wt. ratio) | 50/50 | 40/60 | 30/70 | 40/60 |
| PFR (Ratio of form./phenol) | 1.45 | 1.45 | 1.45 | 1.45 |
| PFRN (Gms) | 1181 | 1146 | 801 | 746 |
| PFR (Gms) | 1181 | 1719 | 1604 | 1146 |
| Hexa (Gms) | 138.8 | 135 | 94 | 89.8 |
| Graphite (Gms) | 2500 | 2000 | 2500 | 3000 |
| Zn Stearate (Gms) | 43.86 | 53.21 | 44.66 | 8.79 |
| Stearyl Stearate | 78.96 | 95.77 | 80.40 | 63.24 |
| Furfural (Gms) | 50 | 50 | 50 | 50 |
| Brabender (Dur. of Mix) | 275 | 293 | 250 | 204 |
| Flex. Strength, psi | 8512 | 8516 | 7680 | 8704 |
| Tens. Strength psi | 5787 | 5413 | 5680 | 4293 |
| Flex. Mod. × 10⁶, psi | 1.05 | .841 | 1.18 | 1.38 |
| Sp. Grav. of Molding | 1.578 | 1.493 | 1.576 | 1.680 |

Firing by the method described in Example VI gives vitreous carbon of excellent properties with the following weight loss and shrinkage values:

| | | | | |
|---|---|---|---|---|
| Wt. Loss (%). | 16.99 | 20.73 | 16.88 | 11.27 |
| Shrinkage in length (%) | 6.25 | 7.79 | 6.13 | 3.88 |

EXAMPLE IX

Dramatic improvement in flexural and tensile strength is shown in unfilled PFUN-PFR mixtures, particularly those having a proportion of at least 50% PFUN in the mixture. A master batch of PFUN resin is prepared according to Example II, the PFR master batch is prepared by the procedure of Example IV(a) and the mixtures are prepared by the procedure of Example VI. No hexa or other additive is added. The roll conditions are 240° F. (116° C.) front roll, with back roll unheated. The roll time is measured after melt of the resin has occurred and is continued until the material on the rolls has achieved proper molding plasticity.

| Run No. | A | B | C | D |
|---|---|---|---|---|
| PFUN/PFR Ratio | 5/95 | 20/80 | 30/70 | 50/50 |
| Roll Time (min.) | 0.75 | 1.75 | 4.75 | 8.5 |
| Piston line pressure (psig) | 450 | 800 | 800 | 800 |
| Cure Time (min. at 335° F.) | 4 | 4 | 4 | 4 |
| Flexural strength* (psi) | 5,030 | 8,688 | 7,808 | 17,473 |
| Flexural Mod.* (Psi) | 830,000 | 700,000 | 700,000 | 640,000 |
| Tensile strength* (psi) | 4,064 | 4,896 | 5,888 | 7,824 |
| Brabender Miniumum Torque (meter-gms) | 1,590 | 1,090 | 1,350 | 1,550 |

*These values are the average values for five specimens each prepared according to ASTM D1896.

EXAMPLE X

The procedure of Example VI is repeated a number of times except that no filler, hexa or additive is added. As shown in the following table, increasing proportions of the phenol-furfural Novolak (PFUN) are used, with the corresponding conditions and results reported in the table. It will be noted that with 40% PFUN and higher proportions of PFUN, the strength properties show a tremendous increase in values, more than double in some cases. The roll conditions are 240° F. (156° C.) for the front roll and the back roll is unheated. The roll time is measured after melting of the resin has occurred. Roll time is prolonged until proper molding plasticity is achieved. Even without plasticizer, hexa and other additives, the compositions containing 20% or more PFUN are found to mold easily without sticking by transfer, compression and injection molding to give shaped molded objects of excellent properties.

will meet the conditions to which they will be exposed for use in fuel cells.

As shown in Examples VI–VIII, the preferred ratios of PFUN/PFR run from 30/70 to 50/50. As also pointed out above, the phenol-furfuraldehyde Novolak has a plasticizing effect on the resol resin allowing the viscous mass to flow more uniformly and readily at lower pressure to completely fill the mold. This is particularly evident when the resin is filled with a substantial amount of filler such as graphite. This improved plasticity has made it possible to mold and convert to vitreous carbon PFUN-PFR-graphite filled plates as large as 50"×50" and having a thickness of 0.04–0.05 inch, and having excellent resistance to permeability

TABLE

|  | A | B | C | D | E | F | G |
|---|---|---|---|---|---|---|---|
| Ratio of PFUN/PFR | 5/95 | 20/80 | 30/70 | 40/60 | 50/50 | 60/40 | 70/30 |
| Molding Transfer Piston Line Pressure, psig | 450 | 800 | 800 | 900 | 675 | 550 | 550 |
| Cure Time (Min.) at 335° F. | 4 | 4 | 4 | — | 4 | — | — |
| Flexural Strength* psi | 5,030 | 8,688 | 7,808 | 15,590 | 16,839 | 18,240 | 14,899 |
| Flexural Modulus* psi × $10^{-2}$ | 8,300 | 7,000 | 7,000 | 14,000 | 15,000 | 14,000 | 15,000 |
| Tensile Strength* | 4,064 | 4,986 | 5,888 | 5,808 | 7,776 | 8,912 | 6,592 |
| Brabender Min. Torque (meter-gms) | 1,590 | 1,090 | 1,350 | 17,750 | 1,525 | 1,850 | 1,600 |

*These values are the average for five specimens prepared in accordance with ASTM D1896.

EXAMPLE XI

The procedures of Examples I, IV and VI are repeated a number of times with satisfactory results using:

(a) An equivalent amount of meta-cresol in place of the phenol in preparing the Novolak and the resol and these are used in the procedure of Example VI;

(b) An equivalent amount of p,p'-diphenylolmethane is used in place of phenol in preparing the Novolak and this is used with the PFR in the procedure of Example VI;

(c) An equivalent amount of beta-naphthol is used in place of phenol in preparing the resol and this is used with the PFUN in the procedure of Example VI.

The vitreous carbon products made from the intimate blend of resins described above, densified and molded as also described above, are very much improved in freedom from pits and holes in the products and also the percentage of unsatisfactory items as a result of cracking or failures of any type are very much reduced in comparison with vitreous carbons made from individual resins or even with mixtures of resins other than those described and claimed herein. Where appropriate mixtures are not used, cracking and failures may occur during the carburization to vitreous products, particularly of plates of low thickness and in some cases, during the molding of the same.

This improvement with respect to freedom from pits and holes and cracks in the vitreous carbon products is evidenced by improved resistance to permeability and also in the reduction in the number of rejects when the vitreous carbon products, such as large thin plates, are subjected to various tests to determine whether they and freedom from cracks and pits.

While the above description of the present invention has stressed a preference for starting with finely divided Novolak and resol resins, it is nevertheless contemplated that other methods of producing equivalent intimate blending of these resins by starting with larger particles than specified above will be suitable for the practice of this invention. For example, where appropriate processing by prolonged rolling, etc. of larger particles will produce comminuted and equivalent intimately and uniformly mixed compositions of the Novolak and resol resins, such procedures may be used. However, such prolonged processing may be much less practical than the preferred methods described above.

Moreover, where reference is made to phenol-furfural Novolaks, it is intended that this include Novolaks in which other aldehydes may be used to replace a minor amount of furfuraldehyde in the formation of the resin. Thus in referring to a phenol-furfural Novolak, it is intended to include Novolaks in which the major molar amount of the aldehyde used to condense with the phenol is furfural. In other words, while 100 molar percent of furfural is preferred for this purpose, it is found that so long as at least 50 percent of the condensing aldehyde is furfural, the resulting Novolak gives preferred results for the purpose of this invention.

Normally, a phenol-aldehyde resol is liquid. when this is blended with a phenol-aldehyde Novolak, the resol functions first as a plasticizer. The resultant mixture is extremely difficult to body sufficiently to permit molding pressures. During molding of such mixtures, gas is given off which produces pits and holes in the molded product.

To avoid the problems described above, applicants have found that hard, solid resols may be obtained which are pulverizable to finely divided particles by the addition of hexa, or ammonia (preferably in aqueous solution), during or after the preparation of the resol as described in above Examples IVa, b, c and d.

The amount of hexa to be added should be in the range of 1 to 10 percent by weight or even higher, preferably 1.3–10 percent, based on the total weight of resin solids. The amount of ammonia is the molar equivalent of the specified amount of hexa. Another method of calculating the desired amount is to calculate that the methylene content derived or derivable from the hexa and the formaldehyde should be in the range of 1.05 to 1.5 per mole of phenol.

In one of the parent applications, the Patent Office cited U.S. Pat. Nos. 3,927,140 and 3,879,338 which involve mixtures of phenol-aldehyde Novolaks and resols. However, in addition to other distinctions, the resols are the normal type and therefore such mixtures would present the problems discussed above.

While certain features of this invention have been described in detail with respect to various embodiments thereof, it will of course be apparent that other modifications can be made within the spirit and scope of this invention, and it is not intended to limit the invention to the exact details shown above except insofar as they are defined in the following claims.

The invention claimed is:

1. A solid thermosettable intimate blend comprising 30–76 percent by weight of a finely divided carbonaceous particulate filler and 24–70 percent by weight of a finely divided phenolic resin mixture comprising 20–80 parts by weight of a phenolic-furfuraldehyde Novolak resin which is fusible upon heating, and 20–80 parts by weight of a phenolic-aldehyde resol resin, which is thermosettable upon heating, the sum of said parts of Novolak and resol resins totaling 100 parts by weight, the aldehyde in said Novolak comprising at least 50 molar percent of furfuraldehyde.

2. The blend of claim 1 in which the carbonaceous filler is graphite and the phenolic in both resins is phenol.

3. The blend of claim 2 in which the graphite is present in the proportion of 35–65 percent by weight and the resin mixture is 35–65 percent by weight of the total resin composition.

4. The blend of claim 3 in which the phenolic-furfuraldehyde Novolak/phenolic-aldehyde resol resin ratio is in the range of 30/70 to 50/50.

5. The blend of any of claims 1 to 4 in which the aldehyde of the resol resin is formaldehyde.

6. The blend of any of claims 1 to 4 in which the aldehyde in said Novolak is substantially 100 molar percent furfuraldehyde.

7. The blend of claim 2 in which the aldehyde in said Novolak is at least 75 molar percent furfuraldehyde.

8. The blend of claim 1 which is formed from Novolak resin particles having a size no greater than 40 mesh.

9. The blend of claim 2 which is formed from resol resin particles having a size no greater than 40 mesh.

10. The blend of claim 5, in which said blend is derived from Novolak resin particles having a size no greater than 100 mesh.

11. The blend of claim 3 in which said blend is derived from Novolak resin particles having a size no greater than 32 microns.

12. The blend of claim 11 in which the resol aldehyde is formaldehyde and the graphite proportion is 40–60 percent by weight based on the total resin composition.

13. The blend of claim 4 in which the resol aldehyde is formaldehyde and the graphite proportion is 40–60 percent by weight based on the total resin composition.

14. The blend of claim 4, in which the furfuraldehyde/phenol molar ratio in said Novolak resin is in the range of 0.6/1 to 0.9/1.

15. The blend of claim 4, in which the resol aldehyde is formaldehyde and the formaldehyde/phenol molar ratio in said resol resin is in the range of 1.05/1 to 1.55/1.

16. The blend of claim 4, in which the resol aldehyde is formaldehyde and the furfuraldehyde/phenol molar ratio in said Novolak resin is in the range of 0.7/1 to 0.75/1.

17. A process for preparing a blend of claim 1, comprising the steps of:
(1) grinding a solid phenolic furfuraldehyde Novolak resin to a particle size of less than 40 mesh on a U.S. Standard sieve;
(2) grinding a solid phenolic-aldehyde resol resin, capable of thermosetting merely upon heating, to a particle size of less than 40 mesh on a U.S. Standard sieve; and
(3) mixing said ground resins together with a finely divided carbonaceous powder to a homogeneous mixture suitable for molding, said carbonaceous powder being used in a proportion of 30–70 percent based on total weight of carbonaceous powder and resin powders, and said Novolak and resol powders being used in a proportion of 20–80 parts by weight of said Novolak and 20–80 parts by weight of said resol, the combined weight of said Novolak and said resol totaling 100 parts by weight.

18. The process of claim 17 in which the phenolic in both resins is phenol.

19. The process of claim 18 in which said phenolic-furfuraldehyde Novolak resin is a phenol-aldehyde resin in which at least 50 molar percent of the aldehyde is furfuraldehyde.

20. The process of claim 19 in which at least 75 molar percent of the said Novolak aldehyde is furfuraldehyde.

21. The process of claim 19 in which substantially all of said Novolak aldehyde is furfuraldehyde.

22. The process of claim 21 in which the aldehyde in said resol is formaldehyde.

23. The process of claim 18 in which the aldehyde in said resol is formaldehyde.

* * * * *

UNITED STATES PATENT AND TRADEMARK OFFICE
CERTIFICATE OF CORRECTION

PATENT NO.   : 4,526,924
DATED        : July 2, 1985
INVENTOR(S)  : Louis L. Korb and Phillip A. Waitkus It is certified that error appears in the above-identified patent and that said Letters Patent is hereby corrected as shown below:

Col. 6, line 64, correct "partical" to read ---practical---.

Col. 7, line 12, correct "lubrican" to read ---lubricant---;

Col. 7, line 13, correct "impace" to read ---impact---;

Col. 7, line 14, correct "homoe" to read ---homo- ---; and

Col. 7, line 54, correct "system" to read --- systems ---.

Signed and Sealed this

First Day of October 1985

[SEAL]

Attest:

DONALD J. QUIGG

Attesting Officer

Commissioner of Patents and
Trademarks—Designate